(12) United States Patent
Webb

(10) Patent No.: US 8,813,946 B2
(45) Date of Patent: Aug. 26, 2014

(54) CONVEYORS

(75) Inventor: Michael Webb, Fleet (GB)

(73) Assignee: Quin Systems Limited (GB)

( * ) Notice: Subject to any disclaimer, the term of this patent is extended or adjusted under 35 U.S.C. 154(b) by 0 days.

(21) Appl. No.: 13/696,132

(22) PCT Filed: May 5, 2011

(86) PCT No.: PCT/GB2011/050880
§ 371 (c)(1),
(2), (4) Date: Jan. 23, 2013

(87) PCT Pub. No.: WO2011/138615
PCT Pub. Date: Nov. 10, 2011

(65) Prior Publication Data
US 2013/0112528 A1 May 9, 2013

(30) Foreign Application Priority Data

May 5, 2010 (GB) .................................. 1007491.2

(51) Int. Cl.
*B65G 47/53* (2006.01)
(52) U.S. Cl.
USPC .................. 198/419.3; 198/465.3; 198/803.2

(58) Field of Classification Search
USPC ......... 198/419.3, 426–429, 431, 465.3, 803.2
See application file for complete search history.

(56) References Cited

U.S. PATENT DOCUMENTS

| 4,633,652 A * | 1/1987 | Dagenais et al. ............... 53/444 |
| 4,768,642 A * | 9/1988 | Hunter ........................ 198/419.2 |
| 6,019,213 A * | 2/2000 | Schubert ...................... 198/419.3 |
| 6,209,708 B1 * | 4/2001 | Philipp et al. .............. 198/465.1 |
| 6,223,884 B1 * | 5/2001 | Ronchi ..................... 198/457.01 |
| 6,691,856 B1 * | 2/2004 | Prakken ..................... 198/419.3 |
| 7,624,856 B2 * | 12/2009 | Monti ........................ 198/419.3 |
| 7,654,381 B2 * | 2/2010 | Webb .............................. 198/431 |
| 8,448,776 B2 * | 5/2013 | Papsdorf et al. ........... 198/419.3 |

* cited by examiner

*Primary Examiner* — Douglas Hess
(74) *Attorney, Agent, or Firm* — Barnes & Thornburg LLP

(57) ABSTRACT

Elongate packs of circular biscuits are fed at high speed from a wrapping output conveyor to a transverse indexing conveyor. The indexing conveyor has a series of compartments with inclined sides, each compartment receiving a pair of packs end to end. The conveyor indexes each time that it receives a pair of packs, the compartments holding the packs against movement longitudinally of the conveyor. The packs are removed in groups from the indexing conveyor and urged together on a tray of adjustable dimension. Orientation of the packs is maintained, for consistent presentation of printing ABCD.

16 Claims, 3 Drawing Sheets

CONVEYORS

The present invention relates to conveyors and is concerned particularly, although not exclusively, with the handling of elongate packs of circular cross-section.

Elongate circular-section packs may contain, for example, a stack of circular biscuits in a flexible wrapping. There is a requirement to change the direction of travel of elongate circular-section packs from diameter-end-leading, as typically produced from a wrapping machine, to long-dimension-leading, to make it easier to hand pack the packs into cases.

A method currently used is simply to feed the diameter-edge-leading packs from a first conveyor onto a second conveyor travelling at 90 degrees to the first conveyor. For low speed and hand packing this may be satisfactory, provided that the packs do not change their angle very much during the transfer from one conveyor to the other and what change there is can easily be corrected by people hand packing the cases.

However, where it is required to automate the packing of cases and to be able to handle packs from the wrapping machine at much higher speeds (at least double), such known methods are insufficiently accurate.

GB 2 435 458 discloses an improved method of conveying packs of circular items, in which a second conveyor is indexed each time that it receives a product from the first conveyor.

Preferred embodiments of the present invention aim to provide improved methods and apparatus that can operate faster than known methods and apparatus and are improved in other respects.

According to one aspect of the present invention, there is provided a method of conveying products, comprising the steps of conveying products sequentially on a first conveyor and receiving the products sequentially on a second conveyor travelling transversely of the first conveyor, wherein the second conveyor indexes each time that it receives a set of products from the first conveyor and the second conveyor comprises a series of compartments, each of which receives a respective set of the products and holds the products against movement longitudinally of the second conveyor.

According to another aspect of the present invention, there is provided apparatus for conveying products, comprising a first conveyor arranged to convey products sequentially and a second conveyor arranged to travel transversely of the first conveyor, to receive products sequentially from the first conveyor and to index each time that it receives a set of products from the first conveyor, wherein the second conveyor comprises a series of compartments, each of which receives a respective set of the products and holds the products against movement longitudinally of the second conveyor.

Preferably, said compartments have inclined sides.

Preferably, said products are elongate.

Preferably, said products are of circular cross-section.

Preferably, said products are packs of circular items. For example, said items may be round biscuits.

Preferably, said first conveyor is an output conveyor from a wrapping machine.

Preferably, a grouping means is arranged to remove a group of products from said second conveyor.

Preferably, said grouping means is arranged to urge the products of a group together after and/or during removal of the products from said second conveyor.

Preferably, said grouping means comprises a receiving device of adjustable dimension.

Preferably, said grouping means is arranged to remove a group of products from said second conveyor during intervals between indexing movements of the second conveyor.

Preferably, retaining means is arranged to limit movement of products in said compartments transversely of the direction of movement of said second conveyor Preferably, each said set of products comprises two or more of said products, which are arranged end to end in the respective said compartment.

Preferably, each of said products has a longitudinal axis and orientation about that axis is substantially maintained as it is conveyed by said second conveyor and/or handled by said grouping means.

Said compartments may be defined by a series of flights, each of the flights comprising at least one horizontal shelf to support a product having a flat base, an upstanding rib at the side of the shelf to limit movement of a product supported on the shelf, and at least one inclined face to support a product to be conveyed.

For a better understanding of the invention, and to show how embodiments of the same may be carried into effect, reference will now be made, by way of example, to the accompanying diagrammatic drawings, in which.

Figure 2:
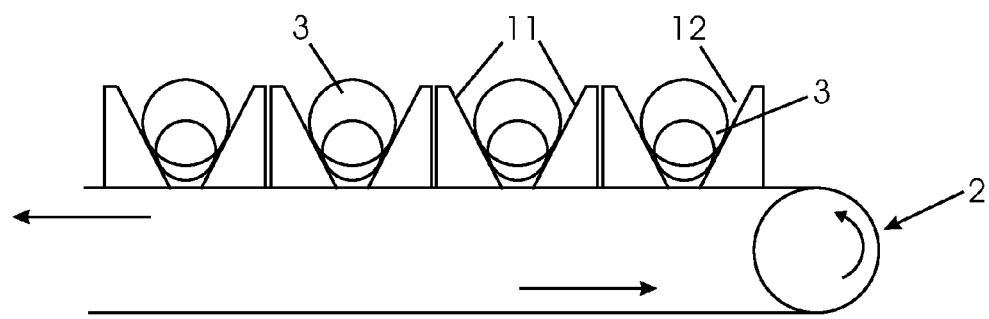
FIG. 2 illustrates one of the conveyors of FIG. 1 in side view.
Figure 3A:
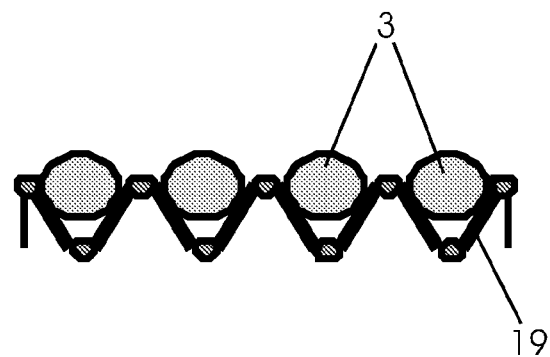
Figure 3B:
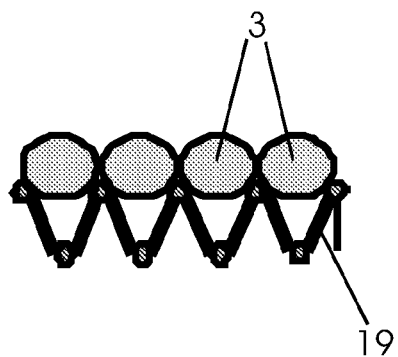
Figure 4:
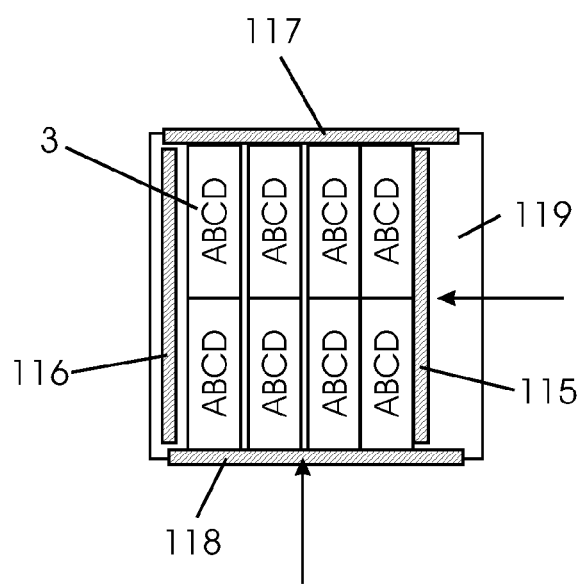
Figure 5:
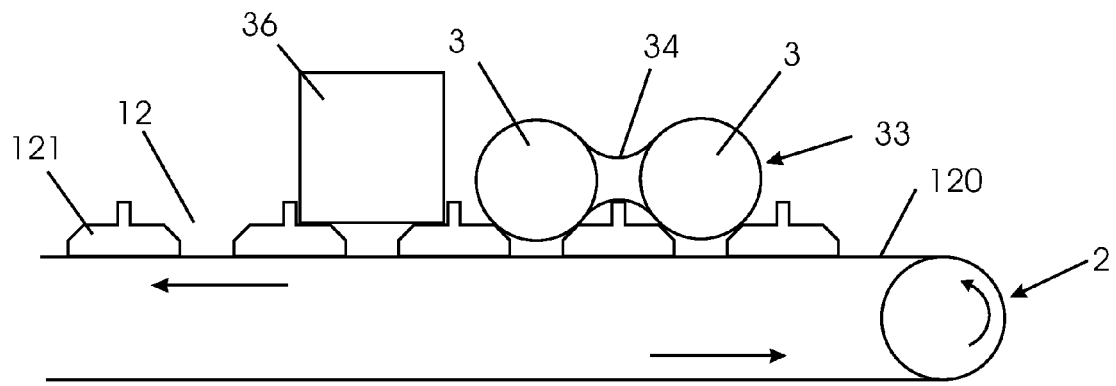
Figure 6:
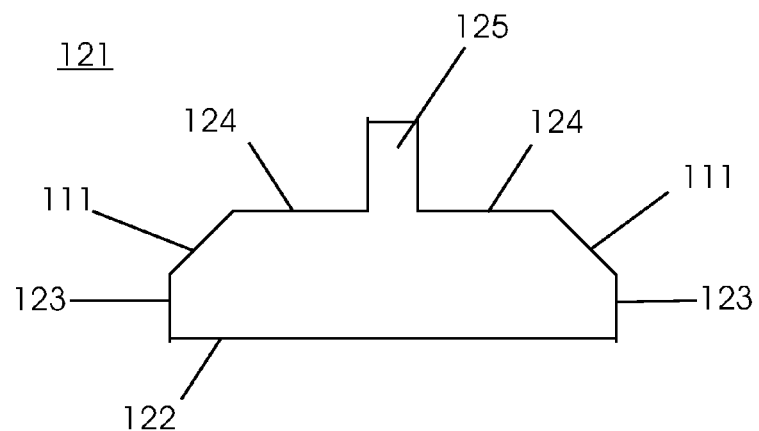

FIGS. 3*a* and 3*b* show a receiving tray in expanded and compressed positions respectively;

FIG. 4 shows an alternative grouping means in plan view;

FIG. 5 is a view similar to that of FIG. 2, but showing a modified conveyor; and FIG. 6 is an enlarged end view of a flight of the conveyor of FIG. 5.

In the figures, like references denote like or corresponding parts.

Figure 1:
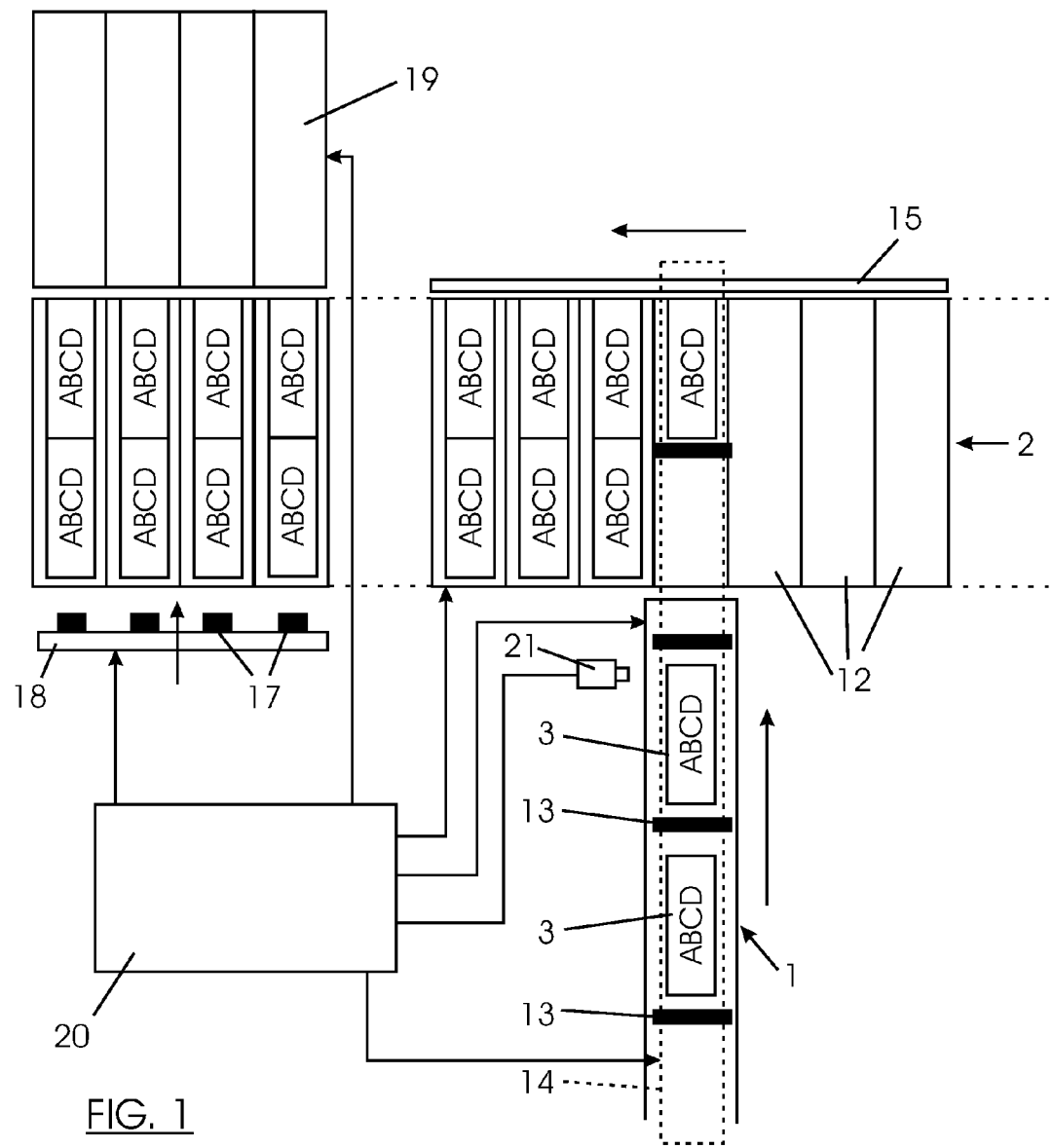
FIG. 1 illustrates two conveyors in plan view.

The conveyor 2 shown in FIG. 1 is an indexing conveyor rather than a continuously running conveyor—that is, it is arranged to travel in predetermined increments with intervals between each increment of travel. The conveyor 2 is arranged to travel at 90 degrees to a wrapping output conveyor 1, which conveys elongate packs 3 of circular cross-section in an axial direction—that is, with their diameter-ends leading. For example, each pack 3 may contain a stack of circular biscuits.

Packs 3 are continuously fed at high speed and at regular intervals from the output conveyor 1 to the indexing conveyor 2, which receives the packs 3 and conveys them in a direction orthogonal to that of the output conveyor 1—that is, with their long-dimensions leading. The indexing conveyor 2 indexes (in this example) a set of two packs 3 at a time and is always ready to receive the next pack from the output conveyor 1 at full pack rate. The output conveyor 1 typically runs continuously, but could also be indexed, to synchronise with the indexing of the conveyor 2.

The indexing conveyor 2 is provided with a regular series of inclined lugs 11, which define compartments in the form of V-section section channels or pockets 12 that receive and centre the packs 3 between the lugs 11, with each pack 3 between a respective pair of lugs 11. The lugs 11 are arranged symmetrically in this embodiment (they could alternatively be asymmetrical) and can accommodate a range of diameters of circular packs 3 whilst maintaining a constant pitch. The lugs 11 ensure that the packs 3 do not change their angle during transfer from the wrapping output conveyor 1. The lugs 11 are preferably provided with a high-friction surface, to inhibit rotation of the packs 3 about their longitudinal axes. In this way, printing ABCD at (say) the tops of the packs 3 as they are presented on the second conveyor 1 may remain visible at the tops of the packs 3, which may be important for subsequent packaging and display.

The lugs 11 keep the packs 3 in position whilst the conveyor 2 (typically a belt conveyor) carries out fast indexes with high accelerations. An option includes a height adjustable guide bar over the tops of the packs 3 and adjustable side guides, to further restrain unwanted movement of the packs 3. An end stop 15 limits movement of the packs 3 as they enter the pockets 12.

Moving lugs 13 on an overhead belt 14 engage with the packs 3 to propel them into the pockets 12. The arrangement is such that each pocket 12 receives two packs 3 end to end. Thus, one lug 13 engages a first pack 3 to propel it to the end of the pocket 12, where it is arrested by the end stop 15. The next lug 13 engages a following pack 3 to propel it mid-way along the same pocket 12, where it is arrested by the first pack 3. The conveyor 2 then indexes by one pocket 12, ready to receive the next pair of packs 3.

The lugs 13 may impart predetermined amounts of energy to the packs 3, such that packs 3 are propelled substantially to the end of the pocket 12 or mid-way along the pocket 12 in turn. Alternatively, the lugs 13 may engage the packs 3 to convey them to specific, pre-determined positions along the pockets 12. In another variant, each lug 13 engages and propels two packs 3 at a time into a respective pocket 12. The lugs 13 on overhead belt 14 may then sweep at half of the previous speed.

At an output station, a set of four fingers 17 on a pusher bar 18 engage four pairs of packs 3 and push them into a receiving tray 19. As seen in FIGS. 3a and 3b, the receiving tray 19 is of concertina construction, such that it is of adjustable size. In FIG. 3a, four pairs of packs have been received in the tray 19, from the first conveyor 2. In FIG. 3b, the concertina base of the tray 19 has been compressed, to bring the packs 3 closely together, without causing rotation of the packs 3 about their longitudinal axes, and thereby preserving the top orientation of the printing ABCD. The packs 3 are then in a convenient juxtaposition to be picked by (say) a robot arm and placed in a carton, closely positioned together and in a correct orientation to display the printing ABCD.

A controller 20 controls and synchronises operation of the conveyors 1, 2, overhead lug belt 14, pusher bar 8, receiving tray 19 and other components, which may include one or more photo detector 21 or other detector for detecting position and/or velocity of packs 3. After a pushing operation, the pusher bar 18 may be lifted for return travel above the conveyor 2, and returned to its start position.

In the variant shown in FIG. 4, a pusher bar 118 pushes a group of packs 3 onto a flat belt conveyor 119, where they are arrested by an adjustable end stop 117. An adjustable sidebar 116 is provided at one end of the conveyor 119 and an elongate lug 115 is mounted on the belt of the conveyor 119. The packs 3 are clamped lightly between the pusher bar 118 and the end stop 117. The belt conveyor 119 is moved by a small amount to the left as seen in FIG. 4, which causes the pairs of packs 3 to close up until they are clamped lightly between the sidebar 116 and the lug 115. The surface of the belt conveyor 119 has a relatively low coefficient of friction so that, as the packs 3 are closed up due to movement of the belt conveyor 119 and the lug 115, the packs 3 do not rotate to a significant degree.

In the context of this specification, a pack does not rotate to a significant degree and/or substantially maintains its orientation if it rotates less than 15, 10 or 5 degrees about its longitudinal axis.

When the eight packs 3 (in this example) are closed up between the pusher bar 118, end stop 117, sidebar 116 and lug 115, they are ready to be picked up by (for example) a robotic device. In an optional modification, the sidebar 116 may be moved out of position (e.g. by a pivoting action) to allow an entire group of packs 3 to be swept off the conveyor 119 by the lug 115, to a reject bin. For example, if a group of packs 3 is picked by a vacuum device and sensors detect that the pickup has at least partially failed, the sidebar 116 is moved out of position and the entire group is swept away. This enables any occasional pickup failure to be dealt with rapidly within the normal cycle of the apparatus, without any need to stop or reduce its speed of operation.

It will be appreciated that the illustrated embodiments of the invention as described above facilitate the rapid packing of products. For example, if packs 3 arrive on the conveyor 1 at a rate of 180 per minute, then the conveyor 2 needs to index only one pocket 12 at a time at a rate of 90 per minute, thus facilitating high speed throughput of products, in relation to the maximum indexing rate of conveyor 2.

By way of example, packs such as the packs 3 may have diameters in the range 20 mm to 100 mm and lengths in the range 100 mm to 300 mm. Packs other than those of exact circular cross-section may be handled by apparatus and methods as disclosed herein.

In the illustrated embodiments as described above, two packs are accumulated in each pocket 12. A greater number of products may be accumulated in each pocket 12 to form a set. Packs 3 are output from the conveyor 2 in groups of four sets, but a greater or lesser number of sets of products may be output in such groups.

FIGS. 5 and 6 illustrate a modification of the indexing conveyor 2, in which compartments or pockets 12 are defined between respective flights 121 that are secured to a belt 120 of the conveyor 2. Each flight is of substantially constant cross-section and extends across the width of the belt 120.

In this example, each flight 121 comprises a base 122 and a respective upstand 123 and horizontal shelf 124 at each side of a central rib 125. A respective inclined face 111 extends between each upstand 123 and shelf 124.

As shown in FIG. 5, cartons 36 of rectangular section may readily be accommodated in the pockets 12, resting on the shelves 124 and constrained against movement longitudinally of the conveyor 2 by the ribs 125. Circular packs 3 may be centred between the inclined faces 111, much as in the preceding embodiments. Moreover, as shown in FIG. 5, a twin-pack made up of two circular packs 3 secured by an outer flow-wrap 34 may conveniently be carried in two adjacent pockets 12, with a central part of the flow-wrap 34 resting over the intermediate rib 125. (For ease of illustration, the central part of the flow-wrap 34 is shown rather larger than it would typically be in practice.)

Thus, it will be appreciated that a conveyor 2 with flights 121 may readily accommodate products of differing sizes and shapes, without the need to disassemble and reassemble the conveyor 2 to change products.

As in the preceding embodiments, two packs such as 3 or 36 may be received end to end in each pocket 12—or any other number of packs to make up a set. However, the novel configuration of flight 121 may be adapted for use in conveyors generally, whether or not a pocket 12 receives one or more item to be conveyed. Thus, the invention provides in a further aspect a conveyor comprising a series of flights defining compartments to receive products to be conveyed, each of the flights comprising at least one horizontal shelf to support a product having a flat base, an upstanding rib at the side of the shelf to limit movement of a product supported on the shelf, and at least one inclined face to support a product to be conveyed. Such a conveyor may further comprise any of the features as illustrated in FIGS. 5 and 6, in any practical permutation.

In this specification, the verb "comprise" has its normal dictionary meaning, to denote non-exclusive inclusion. That is, use of the word "comprise" or any of its derivatives) to include one feature or more, does not exclude the possibility of also including further features.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of conveying products, comprising the steps of conveying products sequentially on a first conveyor and receiving the products sequentially on a second conveyor travelling transversely of the first conveyor, wherein the second conveyor indexes each time that it receives a set of products from the first conveyor and the second conveyor comprises a series of compartments, each of which receives a respective set of the products and holds the products against movement longitudinally of the second conveyor; and wherein each set of products comprises two or more products that are arranged end to end in the respective compartment, and the products are propelled from the first conveyor into the compartments of the second conveyor.

2. A method according to claim 1, wherein said compartments have inclined sides.

3. A method according to claim 1, wherein said products are elongate.

4. A method according to claim 1, wherein said products are of circular cross-section.

5. A method according to claim 1, wherein said products are packs of circular items.

6. A method according to claim 5, wherein said items are round biscuits.

7. A method according to claim 1, wherein said first conveyor is an output conveyor from a wrapping machine.

8. A method according to claim 1, wherein a grouping means is arranged to remove a group of products from said second conveyor.

9. A method according to claim 8, wherein said grouping means is arranged to urge the products of a group together after and/or during removal of the products from said second conveyor.

10. A method according to claim 8, wherein said grouping means comprises a receiving device of adjustable dimension.

11. A method according to claim 8, wherein said grouping means is arranged to remove a group of products from said second conveyor during intervals between indexing movements of the second conveyor.

12. A method according to claim 8, wherein orientation of each of said products about its longitudinal axis is substantially maintained as it is handled by said grouping means.

13. A method according to claim 1, wherein retaining means is arranged to limit movement of products in said compartments transversely of the direction of movement of said second conveyor.

14. A method according to claim 1, wherein each of said products has a longitudinal axis and orientation about that axis is substantially maintained as it is conveyed by said second conveyor.

15. A method according to claim 1, wherein said compartments are defined by a series of flights, each of the flights comprising at least one horizontal shelf to support a product having a flat base, an upstanding rib at the side of the shelf to limit movement of a product supported on the shelf, and at least one inclined face to support a product to be conveyed.

16. An apparatus for conveying products, comprising a first conveyor arranged to convey products sequentially and a second conveyor arranged to travel transversely of the first conveyor, to receive products sequentially from the first conveyor and to index each time that it receives a set of products from the first conveyor, wherein the second conveyor comprises a series of compartments, each of which receives a respective set of the products and holds the products against movement longitudinally of the second conveyor; and wherein each set of products comprises two or more products that are arranged end to end in the respective compartment, and the products are propelled from the first conveyor into the compartments of the second conveyor.

* * * * *